United States Patent [19]
Maissa et al.

[11] Patent Number: 5,666,993
[45] Date of Patent: Sep. 16, 1997

[54] PRESSURE ISOLATED PILOT CHECK VALVE

[75] Inventors: Jacques Maissa, Roswell, N. Mex.; Lowell R. Milligan, Houston, Tex.

[73] Assignee: Western Atlas International, Inc., Houston, Tex.

[21] Appl. No.: 433,726

[22] Filed: May 3, 1995

[51] Int. Cl.$^6$ ............................................. F16K 17/04
[52] U.S. Cl. ................................... 137/494; 137/495
[58] Field of Search ............................. 137/494, 495

[56] References Cited

U.S. PATENT DOCUMENTS

| | | | |
|---|---|---|---|
| 1,173,518 | 2/1916 | Hoxsie | 137/494 |
| 3,410,304 | 11/1968 | Paul | 137/494 |
| 5,165,443 | 11/1992 | Buchanan | 137/312 |
| 5,218,991 | 6/1993 | Gray | 137/312 |

*Primary Examiner*—Stephen M. Hepperle
*Attorney, Agent, or Firm*—Alan J. Atkinson

[57] ABSTRACT

An improved check valve for selectively controlling the flow of fluid through a valve seat. A spring biases a plunger against the valve seat when the fluid is stationary. Movement of the fluid pushes the valve plunger against the spring to open the aperture of the valve seat. An actuator selectively exerts a force against the plunger to close the plunger against the valve seat. In one embodiment of the invention, the actuator directs a pressurized fluid against a second end of the plunger, and a seal prevents leakage of such fluid toward the plunger first end in contact with the valve seat. A cavity between the seal and the plunger first end can be vented to the atmosphere to maintain the pressure differential created by the pressurized fluid against the plunger second end.

11 Claims, 2 Drawing Sheets

PRESSURE ISOLATED PILOT CHECK VALVE

BACKGROUND OF THE INVENTION

The present invention relates to check valves for selectively interrupting fluid flow through the aperture of a valve seat. More particularly, the present invention relates to an improved pilot check valve that selectively moves a valve plunger to close the valve seat aperture.

Check valves control the flow of fluids through a conduit or housing. A valve plunger contacts a valve seat to block fluid flow through the aperture and is selectively withdrawn to permit fluid flow through the aperture. In a simple check valve, a spring urges the valve plunger against the valve seat, and the force exerted by the fluid against the valve plunger compresses the spring to unseat the valve plunger from the valve seat. When the fluid pressure subsides, the spring reurges the valve plunger against the valve seat.

A pilot check valve differs from a simple check valve and includes a mechanism for positively closing the valve plunger against the valve seat. One commercial embodiment of a hydraulic pilot check valve is illustrated in FIG. 1, wherein valve plunger A is held against valve seat B by the force exerted by spring C. Valve piston D is positioned between spring C and valve body E and is in contact with fluid in cavity F. Spring C is positioned in cavity G which communicates with the hydraulic fluid at the outlet, and seal H is positioned between cavities F and G in the sealing gap between valve piston D and valve housing I. When hydraulic fluid contacts valve plunger A, spring C is compressed to withdraw plunger A from contact with valve seat B so that the hydraulic fluid can flow from the inlet to the outlet. This position describes the normal open valve configuration which permits hydraulic fluid flow from the inlet to the outlet.

When the fluid in cavity F is pressurized from the common pressure source, valve piston D should theoretically move to compress spring C, which in turn should move to urge valve plunger A into contact with valve seat B. However, this desired movement is hindered because the fluid pressure in cavities F and G is the same. Other than the force exerted by spring C, there is no differential force acting to urge valve plunger A toward valve seat B. This problem limits the successful operation of the hydraulic check valve design shown in FIG. 1. Consequently, the valve plunger may not close the valve seat aperture to prevent fluid flow through the check valve.

Accordingly, there is a need for an improved pilot check valve that can selectively close a valve seat regardless of the valve inlet fluid pressure. The pilot check valve should reliably close the valve seat in response to a selected control operation.

SUMMARY OF THE INVENTION

The present invention provides an improved valve for interrupting fluid flow. In one embodiment of the invention, a plunger has a first end surface for selectively closing a valve seat, and has a second end surface larger than the first end surface. A spring between the plunger and a housing urges the plunger first end toward the valve seat, and a seal is positioned between the first and second ends of the plunger to prevent fluid leakage therebetween. An actuator creates a force against the plunger second end surface for urging the plunger first end surface against the valve seat.

In other embodiments of the invention, a cavity is positioned between the seal and the first end of the plunger. This cavity can be vented to the atmosphere, to the fluid, or to a fluid carrying reservoir. A second seal can be positioned between the cavity and the first end of the plunger. In other embodiments of the invention, the second end of the plunger can comprise an actuator for creating a resulting force to close the plunger against the valve seat. Alternatively, a pressure means can cooperate with the second end of the plunger to urge the plunger toward the valve seat.

DESCRIPTION OF THE PREFERRED EMBODIMENTS

Figure 1:
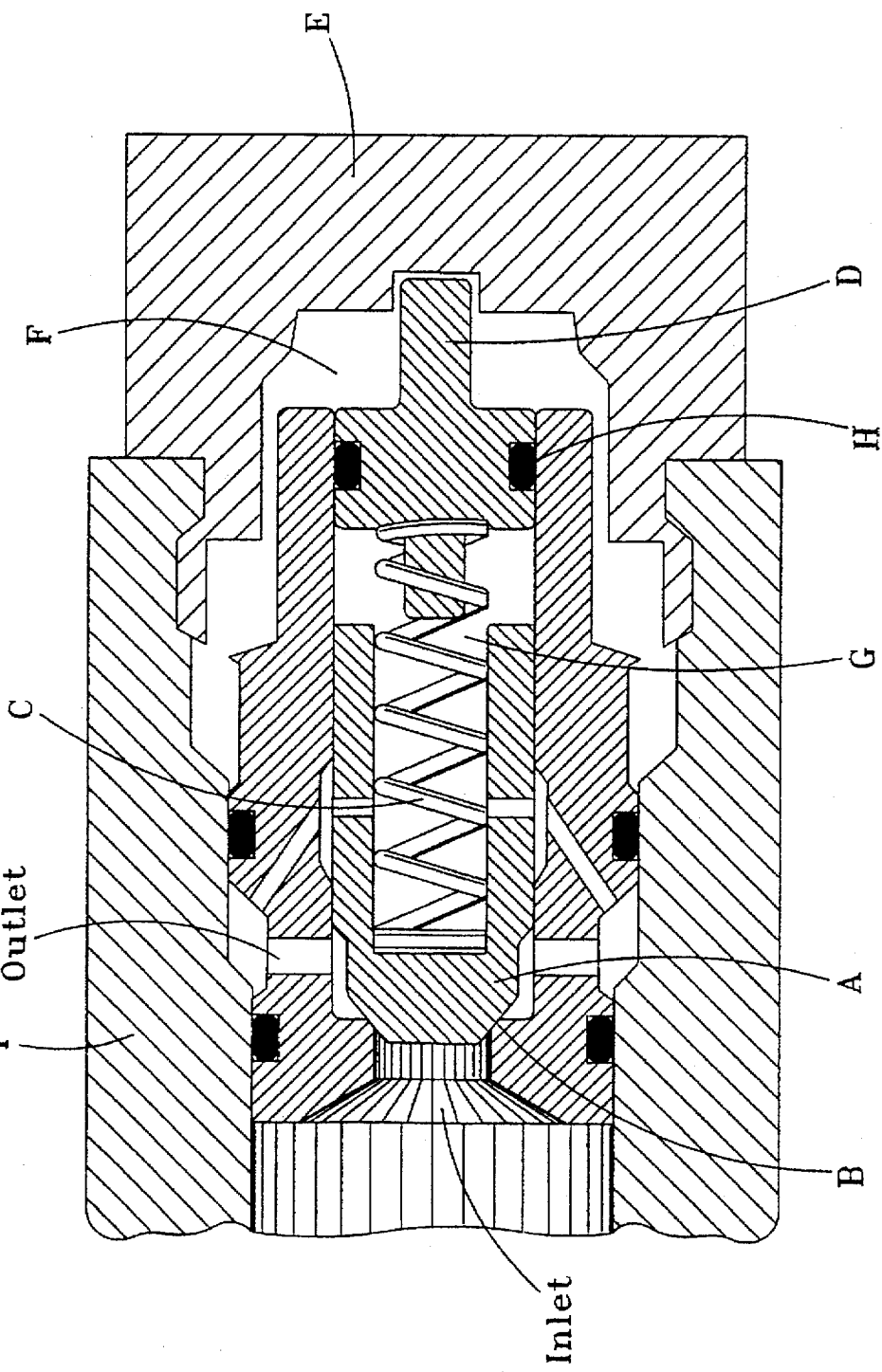
FIG. 1 illustrates one commercial embodiment of a pilot for closing a check valve as described for the background of the invention.

As described above, FIG. 1 illustrates a conventional pilot for closing a valve to interrupt fluid flow. The valve includes valve plunger A for engagement with valve seat B, valve piston D for contacting fluid in cavity F, and spring C between valve plunger A and valve piston D.

Figure 2:
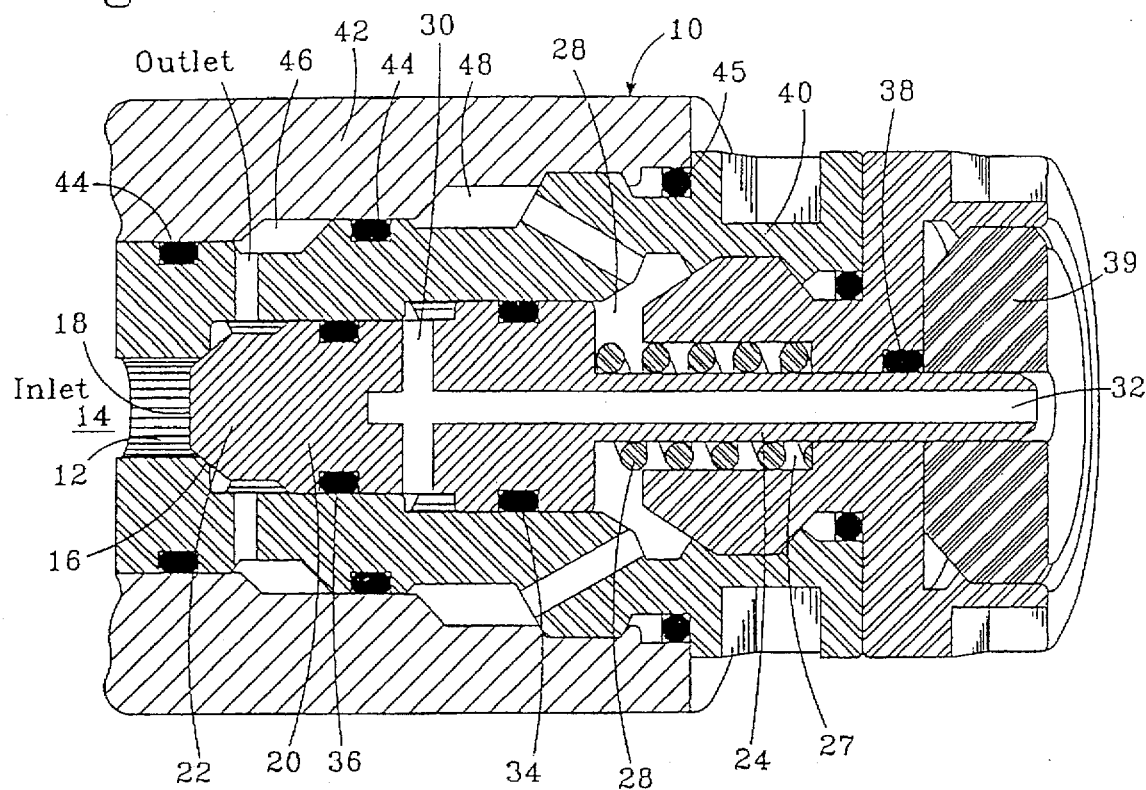
FIG. 2 illustrates a sectional view of the invention in the closed position.

Referring to FIG. 2, the present invention is illustrated in a condition where a fluid flows from inlet to outlet under the conditions described below. As shown in FIG. 2, housing 10 is generally illustrated as a conduit having hollow core 12 for containing fluid such as hydraulic fluid 14. Valve seat 16 is attached to housing 10 and defines aperture 18 for permitting the flow of hydraulic fluid 14.

Figure 3:
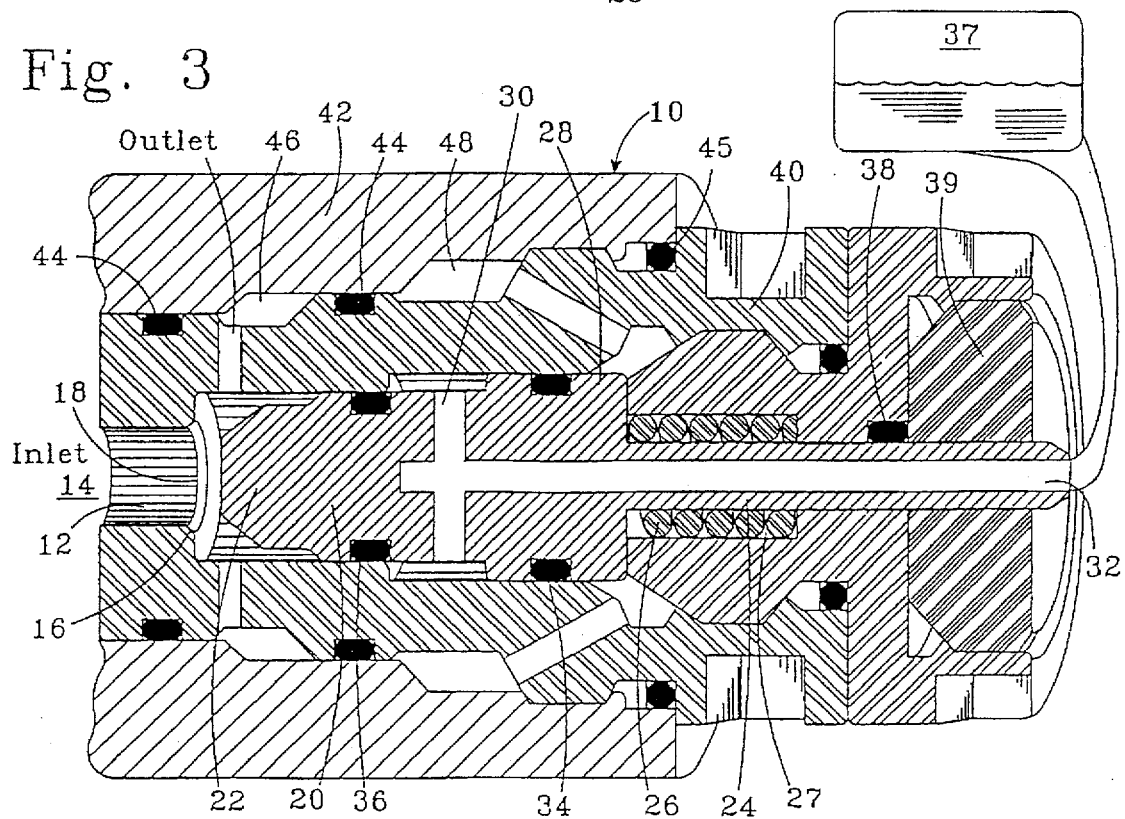
FIG. 3 illustrates a sectional view of the invention in the open position.

Plunger 20 has first end 22 and second end 24. First end 22 contacts valve seat 16 and has a surface area sufficiently large to close aperture 18. When first end 22 closes aperture 18, fluid 14 exerts an axial force against plunger 20 equal to the pressure of fluid 14 multiplied by the surface area of first end 22 in contact with fluid 14. As fluid 14 contacts first end 22 to unseat plunger 20 from valve seat 16, spring 26 compresses as illustrated in FIG. 3. Spring 26 is positioned between second end 24 and recess 27 of housing 10, and returns first end 22 into contact with valve seat 16 when the pressure of fluid 14 subsides.

As illustrated in FIGS. 2 and 3, second end 24 contacts fluid 14 in cavity 28, and second end 24 has a surface area in contact with fluid 14 which is larger than the surface area of plunger first end 22 in contact with fluid 14. The pressure of fluid 14 in cavity 28 will exert a force on plunger 20 equal to the pressure of fluid 14 multiplied by the contacted surface area of second end 24. Since the pressure of fluid in contact with first end 22 and second end 24 is the same, the size difference in the respective surface areas will cause a resultant force differential acting against plunger 20. The orientation of plunger 20 in response to this force differential will cause first end 22 to contact valve seat 16 and to close aperture 18.

Cavity 30 is located between plunger 20 and housing 10, and is shown as being vented to atmospheric pressure through port 32. Seal 34 closes the annulus between plunger 20 and housing 10, and prevents the migration of fluid therebetween. Seal 34 maintains the pressure differential between fluid 14 in cavity 28 and the atmospheric pressure in cavity 3Q. Seal 36 closes the annulus between plunger 20 and housing 10, and is located between cavity 30 and first end 22. Seals 34 and 36 cooperate to maintain the pressure in cavity 30 without permitting fluid leakage into cavity 30.

In alternative embodiments of the invention, port 32 can communicate with a fluid-filled reservoir 37 containing a fluid at ambient pressure.

Seal 38 is positioned between plunger 20 and housing 10 to contain cavity 28 from the ambient pressure, and is retained with lock nut 39. In one alternative embodiment of the invention, housing 10 can be formed from multiple components such as valve body 40 and conduit 42 as shown in FIGS. 2 and 3, or can be constructed as a single element as described above. Seals 44 and 45 selectively enclose channel 46 at the outlet of valve seat 16 and channel 48 leading to cavity 28. Channels 46 and 48 operate as a manifold to selectively distribute fluid 14.

The pressure of fluid 14 in cavity 28 operates as an actuator to move plunger 20 toward valve seat 16. In an alternative embodiment of the invention, cavity 28 can be connected to a different actuator or power source (not shown) which independently pressurizes fluid 14 in cavity 28 to a pressure different than that of fluid 14 in channel 46. In this fashion, the pressurized fluid in cavity 28 functions as an actuator to control the magnitude and timing of the force acting to close first end 22 of plunger 20 against valve seat 16. The response time for closing plunger 20 against valve seat 16 can be selected by changing the respective surface sizes of first end 22 and second end 24, by controlling the fluid pressure magnitude acting on such surfaces, and by changing the distance traveled by first end 22 before it contacts valve seat 16.

The present invention is particularly useful in hydraulic fluid applications but is also applicable to pilots for closing check valves controlling any type of fluid. The invention selectively manages the control of fluid flow through a conduit or housing, and provides a reliable pilot for closing a check valve to interrupt fluid flow through a conduit or housing.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A valve for interrupting fluid flow through the aperture of a valve seat in a housing, comprising:

a plunger having a first end surface for selectively closing the valve seat aperture, and having a second end surface larger than said first end surface;

a spring between said plunger and the housing for urging the first end of said plunger toward the valve seat, wherein said spring is compressible when the fluid exerts a force against the first end surface of said plunger;

a cavity between said plunger first end surface and said plunger second end surface;

a passage from said cavity to a position outside of the housing;

a first seal between the first end of said plunger and said cavity for preventing fluid leakage therebetween;

a second seal between said cavity and the second end of said plunger for preventing fluid leakage therebetween; and a fluid pressure actuator for creating a force against the second end surface of said plunger to urge the first end surface of said plunger into contact with the valve seat.

2. A valve as recited in claim 1, further comprising a liquid reservoir in fluid communication with said cavity through said passage.

3. A valve activatable by a pressurized fluid to interrupt fluid flow through the aperture of a valve seat in a housing, comprising:

a plunger having a first end for selectively closing the aperture and having a second end opposite said first end, wherein said plunger second end has a surface larger than the surface of said plunger first end in contact with the fluid, and wherein the fluid can selectively contact said second end surface to create a resulting force across said plunger to close the first end of said plunger against the valve seat;

a spring between said plunger and the housing for urging the first end of said plunger toward said valve seat, and wherein said spring is compressible when the fluid exerts a force against the first end of said plunger;

a cavity between said plunger and the housing, wherein said cavity is located between the first and second ends of said plunger;

a first seal between said cavity and the first end of said plunger; and a second seal between said cavity and the second end of said plunger.

4. A valve as recited in claim 3, further comprising an actuator acting against the second end of said plunger for moving the first end of said plunger to close said aperture.

5. A valve as recited in claim 3, further comprising a liquid reservoir in fluid communication with said cavity.

6. A valve as recited in claim 3, wherein said spring is positioned between the housing and the second end of said plunger.

7. A valve as recited in claim 3, wherein said spring urges the first end of said plunger against the valve seat when the fluid is stationary, and wherein said spring is compressible when said fluid exerts a force against the first end of said plunger.

8. A valve for interrupting fluid flow of a pressurized fluid, comprising:

a housing;

a valve seat connected to said housing, wherein said valve seat defines an aperture for permitting fluid flow therethrough;

a plunger having a first end for selectively closing said aperture, and having a second end opposite said first end;

a spring between said plunger and said housing for urging the first end of said plunger toward said valve seat, wherein said spring is compressible when the fluid exerts a force against the first end of said plunger;

a cavity between said plunger and said housing, wherein said cavity is located between the first and second ends of said plunger;

a passage from said cavity to a position outside of said housing;

a first seal between said cavity and the first end of said plunger;

a second seal between said cavity and the second end of said plunger; and a fluid activated actuator acting against the second end of said plunger for urging the first end of said plunger to close said aperture.

9. A valve as recited in claim 8, wherein said cavity is vented to the atmosphere.

10. A valve as recited in claim 8, wherein the second end of said plunger has a surface area larger than the surface of the first end of said plunger in contact with the fluid, and wherein said actuator directs pressurized fluid against said second end surface to create a resulting force which moves the first end of the plunger against said valve seat.

11. A valve as recited in claim 10, wherein said actuator cooperates with said housing to selectively direct the fluid into contact with the second end surface of said plunger.

* * * * *